United States Patent
Sadiq et al.

(10) Patent No.: US 11,212,860 B2
(45) Date of Patent: Dec. 28, 2021

(54) DETERMINING BEAM CANDIDATES FOR TRANSMITTING BEAM FAILURE RECOVERY SIGNAL

(71) Applicant: QUALCOMM Incorporated, San Diego, CA (US)

(72) Inventors: Bilal Sadiq, Basking Ridge, NJ (US); Muhammad Nazmul Islam, Edison, NJ (US)

(73) Assignee: QUALCOMM Incorporated, San Diego, CA (US)

(*) Notice: Subject to any disclaimer, the term of this patent is extended or adjusted under 35 U.S.C. 154(b) by 44 days.

(21) Appl. No.: 16/189,229

(22) Filed: Nov. 13, 2018

(65) Prior Publication Data

US 2019/0166645 A1 May 30, 2019

Related U.S. Application Data

(60) Provisional application No. 62/592,392, filed on Nov. 29, 2017.

(51) Int. Cl.
*H04W 72/04* (2009.01)
*H04W 74/08* (2009.01)
(Continued)

(52) U.S. Cl.
CPC .......... *H04W 76/18* (2018.02); *H04B 7/0617* (2013.01); *H04B 7/0695* (2013.01);
(Continued)

(58) Field of Classification Search
CPC .... H04B 7/0617; H04B 7/0695; H04B 7/088; H04B 7/0404; H04B 7/0408; H04B 7/024;
(Continued)

(56) References Cited

U.S. PATENT DOCUMENTS

2017/0302355 A1* 10/2017 Islam ................... H04B 7/0621
2018/0020363 A1* 1/2018 Faxer ...................... H04L 5/005
(Continued)

FOREIGN PATENT DOCUMENTS

WO   WO-2017024516 A1   2/2017
WO   WO-2017151876 A1   9/2017

OTHER PUBLICATIONS

Huawei et al., "Beam Failure Recovery Design Details", 3GPP Draft; R1-1715468, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051338936, Retrieved from the Internet: URL:http://www.3gpp.org/ftp/Meetings_3GPP_SYNC/RAN1/Docs/ [retrieved on Sep. 17, 2017], 10 pages.

(Continued)

*Primary Examiner* — Sai Aung
(74) *Attorney, Agent, or Firm* — Liem T. Do

(57) ABSTRACT

Methods, systems, and devices for wireless communications are described. A user equipment (UE) may identify a beam failure condition. The UE may determine whether a reference signal beam satisfies a beam strength threshold. The UE may transmit, based at least in part on a result of the determining, a beam failure recovery (BFR) signal using resources associated with the reference signal beam.

16 Claims, 10 Drawing Sheets

(51) Int. Cl.
  *H04B 7/0408* (2017.01)
  *H04W 76/18* (2018.01)
  *H04W 16/28* (2009.01)
  *H04B 17/318* (2015.01)
  *H04L 5/00* (2006.01)
  *H04B 7/06* (2006.01)
  *H04B 17/336* (2015.01)
  *H04B 7/08* (2006.01)
  *H04B 17/17* (2015.01)
  *H04B 7/0413* (2017.01)

(52) U.S. Cl.
  CPC ............. *H04B 7/088* (2013.01); *H04B 17/17* (2015.01); *H04B 17/318* (2015.01); *H04B 17/336* (2015.01); *H04L 5/0048* (2013.01); *H04W 16/28* (2013.01); *H04W 72/046* (2013.01); *H04B 7/0413* (2013.01)

(58) Field of Classification Search
  CPC ...... H04B 7/0417; H04B 7/06; H04B 7/0689; H04B 7/0814; H04B 7/086; H04B 7/0897; H04B 17/318
  See application file for complete search history.

(56) References Cited

U.S. PATENT DOCUMENTS

| | | | |
|---|---|---|---|
| 2018/0219604 A1 | 8/2018 | Lu et al. | |
| 2018/0269945 A1* | 9/2018 | Zhang | H04B 7/0632 |
| 2019/0053294 A1* | 2/2019 | Xia | H04B 7/0695 |
| 2019/0081688 A1 | 3/2019 | Deenoo et al. | |
| 2019/0104549 A1* | 4/2019 | Deng | H04L 27/2607 |
| 2019/0159264 A1* | 5/2019 | Zhang | H04W 72/046 |
| 2019/0222279 A1* | 7/2019 | Xi | H04W 72/00 |
| 2019/0253108 A1* | 8/2019 | Zhang | H04B 7/0404 |
| 2019/0386734 A1* | 12/2019 | Nilsson | H04B 7/0404 |
| 2020/0014453 A1* | 1/2020 | Takeda | H04B 7/088 |

OTHER PUBLICATIONS

International Search Report and Written Opinion—PCT/US2018/061053—ISA/EPO—dated Mar. 13, 2019.
Qualcomm Incorporated: "Radio Link Monitoring Consideration", 3GPP Draft; R1-1716386 Radio Link Monitoring Consideration, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051339841, Retrieved from the Internet: URL:http://www.3gpp.org/ftp/Meetings_3GPP_SYNC/RAN1/Docs/ [retrieved on Sep. 17, 2017], 10 pages.
Samsung: "Beam Failure Recovery", 3GPP Draft; R1-1720291, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 27, 2017-Dec. 1, 2017 Nov. 17, 2017, XP051368940, Retrieved from the Internet: URL:http://www.3gpp.org/ftp/tsg%5Fran/WG1%5FRL /TSGR1%5F91/Docs/ [retrieved on Nov. 17, 2017], 8 pages.
Vivo: "Discussion on Beam Failure Recovery", 3GPP Draft; R1-1717473_Discussion on beam failure recovery, 3rd Generation Partnership Project (3GPP), Mobile Competence Centre, 650, Route Des Lucioles, F-06921 Sophia-Antipolis Cedex, France, vol. RAN WG1, No. Prague, CZ; Oct. 9, 2017-Oct. 13, 2017 Oct. 8, 2017, Feb. 26, 2019, XP051340661, Retrieved from the Internet: URL:http://www.3gpp.org/ftp/Meetings_3GPP_SYNC/RAN1/Docs/ [retrieved on Oct. 8, 2017], 7 pages.

* cited by examiner

DETERMINING BEAM CANDIDATES FOR TRANSMITTING BEAM FAILURE RECOVERY SIGNAL

CROSS REFERENCES

The present application for patent claims the benefit of U.S. Provisional Patent Application No. 62/592,392 by SADIQ et al., entitled "DETERMINING BEAM CANDIDATES FOR TRANSMITTING BEAM FAILURE RECOVERY SIGNAL," filed Nov. 29, 2017, assigned to the assignee hereof, and expressly incorporated by reference herein in its entirety.

BACKGROUND

The following relates generally to wireless communication, and more specifically to determining beam candidates for transmitting a beam failure recovery (BFR) signal.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LIE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In some cases, a device may select a beam direction (e.g., beam identification (ID)) for communicating with a network by selecting the strongest beam from among a number of reference signals (RSs) transmitted by a base station. For example, the base station may transmit RSs using various beams (e.g., beamformed signals). The UE may monitor these RSs to identify 'good' candidate beams to become the active beams. Amongst other uses of maintaining this candidate beam set is the use of these beams for transmitting a BFR signal. The BFR signal is typically triggered when certain criteria (such as an estimated block error ratio (BLER) of a control channel falling below a threshold) are met. However, conventional techniques do not provide a mechanism for the UE to select the best candidate beams from the RSs for transmitting the BFR signal.

SUMMARY

The described techniques relate to improved methods, systems, devices, or apparatuses that support determining beam candidates for transmitting a beam failure recovery (BFR) signal. Generally, the described techniques provide criteria for a user equipment (UE) to use when selecting a candidate reference signal (RS) beam to use for transmitting a BFR signal. For example, the UE may identify or otherwise determine that it is operating in a beam failure condition, e.g., one or more criteria associated with an active beam have failed to satisfy a threshold. Accordingly, the UE may detect RS beams transmitted from a base station. The RS beams may be associated with synchronization signal (SS) beams, physical broadcast channel (PBCH) beams, channel state information RSs (CSI-RS) beams, beam refinement signal beams, and the like. The UE may be configured with a beam strength threshold level that generally defines the beam(s) that, when the threshold is satisfied, are suitable candidates for transmitting the BFR signal. The UE may choose from any RS beams that satisfy the beam strength threshold and then transmit the BFR signal using resources associated with the RS beam. The resources may include, but are not limited to, the beam direction, the beam shape, the beam identifier (ID), and the like. In the instance where none of the detected RS beams satisfy the beam strength threshold, the UE may choose any detected RS beam and/or may choose the detected RS beam having a highest beam strength.

A method of wireless communication is described. The method may include identifying a beam failure condition, determining whether a reference signal beam satisfies a beam strength threshold, and transmitting, based at least in part on a result of the determining, a BFR signal using resources associated with the reference signal beam.

An apparatus for wireless communication is described. The apparatus may include means for identifying a beam failure condition, means for determining whether a reference signal beam satisfies a beam strength threshold, and means for transmitting, based at least in part on a result of the determining, a BFR signal using resources associated with the reference signal beam.

Another apparatus for wireless communication is described. The apparatus may include a processor, memory in electronic communication with the processor, and instructions stored in the memory. The instructions may be operable to cause the processor to identify a beam failure condition, determine whether a reference signal beam satisfies a beam strength threshold, and transmit, based at least in part on a result of the determining, a BFR signal using resources associated with the reference signal beam. In some examples, hardware, such an antenna, may be configured to transmit, based at least in part on a result of the determining, a BFR signal using resources associated with the reference signal beam.

A non-transitory computer-readable medium for wireless communication is described. The non-transitory computer-readable medium may include instructions operable to cause a processor to identify a beam failure condition, determine whether a reference signal beam satisfies a beam strength threshold, and transmit, based at least in part on a result of the determining, a BFR signal using resources associated with the reference signal beam.

Some examples of the method, apparatus, and non-transitory computer-readable medium described herein may further include processes, features, means, or instructions for detecting a set of reference signal beams and determining that the reference signal beams of the set fail to satisfy the beam strength threshold. Some examples of the method, apparatus, and non-transitory computer-readable medium described herein may further include processes, features, means, or instructions for selecting any reference signal beam from the set of detected reference signal beams as the reference signal beam.

Some examples of the method, apparatus, and non-transitory computer-readable medium described herein may further include processes, features, means, or instructions for detecting a set of reference signal beams and determining that the reference signal beams of the set fail to satisfy the beam strength threshold. Some examples of the method, apparatus, and non-transitory computer-readable medium described herein may further include processes, features, means, or instructions for selecting a reference signal beam from among the set of reference signal beams that may have a highest beam strength as the reference signal beam.

Some examples of the method, apparatus, and non-transitory computer-readable medium described herein may further include processes, features, means, or instructions for receiving a configuration message that indicates the beam strength threshold.

In some examples of the method, apparatus, and non-transitory computer-readable medium described herein, determining whether a reference signal beam satisfies the beam strength threshold which may include determining that the reference signal beam may be received with a beam strength metric satisfying the threshold.

In some examples of the method, apparatus, and non-transitory computer-readable medium described herein, the beam strength metric comprises one or more of a reference signal received power (RSRP) metric, or a reference signal received quality (RSRQ) metric, or a signal-to-interference-plus-noise ratio (SINR), or an estimated block error ratio (BLER), or a combination thereof.

Some examples of the method, apparatus, and non-transitory computer-readable medium described herein may further include processes, features, means, or instructions for detecting a set of reference signal beams and determining that more than one of the reference signal beams of the set satisfy the beam strength threshold. Some examples of the method, apparatus, and non-transitory computer-readable medium described herein may further include processes, features, means, or instructions for selecting any of the more than one reference signal beams as the reference signal beam.

Some examples of the method, apparatus, and non-transitory computer-readable medium described herein may further include processes, features, means, or instructions for detecting a set of reference signal beams and determining that more than one of the reference signal beams of the set satisfy the beam strength threshold. Some examples of the method, apparatus, and non-transitory computer-readable medium described herein may further include processes, features, means, or instructions for selecting the reference signal beam from the more than one reference signal beams having a highest beam strength as the reference signal beam.

DETAILED DESCRIPTION

Figure 1:
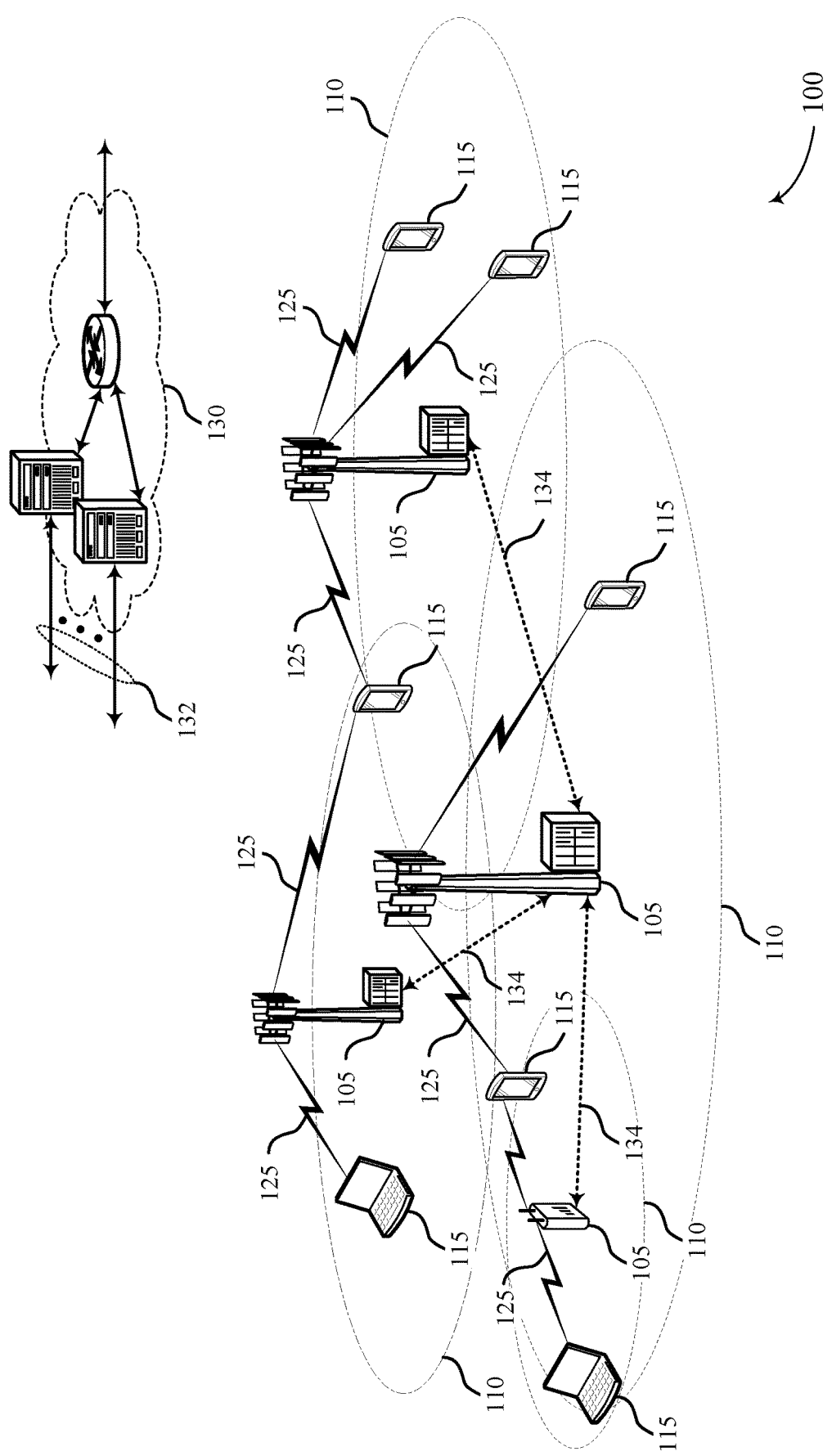
FIG. 1 illustrates an example of a system for wireless communication that supports determining beam candidates for transmitting a BFR signal in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (e.g., directional transmission) may be used to coherently combine signal energy and overcome the path loss in specific beam directions. In some cases, a device may select an active beam for communicating with a network by selecting the strongest beam from among a number of candidate beams.

In mmW systems, various reference signals (RSs) may be beamformed to meet a certain link budget (e.g., an accounting of gains and losses associated with a transmitter and/or a receiver when communicating over a medium). In particular, beamforming may be used to increase the strength or power of wireless signals in a certain direction. Base stations may use several antenna ports connected to subarrays of antennas to form the beams in various directions by appropriately weighting the magnitude and phase of individual antenna ports and signals. A base station may thus use beamforming to transmit the RSs in multiple directions, for example, using different beam IDs. The user equipment (UE) may monitor some or all of the RSs to identify candidate beams for use as an active beam for mmW systems.

The UE may experience a beam failure condition, such as when the UE determines that an estimated block error ratio (BLER) of a control channel fails to meet a threshold. Accordingly, the UE may need to transmit a beam failure recovery (BFR) signal to identify a new active beam. Conventional systems, however, do not provide criteria by which the UE selects the beam to use for transmission of the BFR signal.

Aspects of the disclosure are initially described in the context of a wireless communications system. For example, a UE may determine that a beam failure condition has occurred. The UE may identify a beam direction from detected RS beams that satisfy a beam strength threshold, e.g., meet a certain path loss or transmission power condition. The UE may then select a beam direction for transmitting a BFR signal by choosing one of the beam directions of the RS beams that satisfies the beam strength threshold. For example, if each RS beam satisfies the beam strength threshold, the UE may select any one of the RS beams. If none of the RS beams satisfy the beam strength threshold, the UE may select any detected RS beam, may select a detected RS beam having the highest beam strength, etc., for transmission of the BFR signal. Accordingly, the UE may transmit the BFR signal using resources associated with the RS beam, e.g., beam direction resources, beam shape resources, beam timing resources, and the like.

Aspects of the disclosure are further illustrated by and described with reference to apparatus diagrams, system diagrams, and flowcharts that relate to determining beam candidates for transmitting BFR signal.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some aspects, a UE 115 may identifying a beam failure condition. The UE 115 may determine whether a reference signal beam satisfies a beam strength threshold. The UE 115 may transmit, based at least in part on a result of the determining, a BFR signal using resources associated with the reference signal beam.

Figure 2:
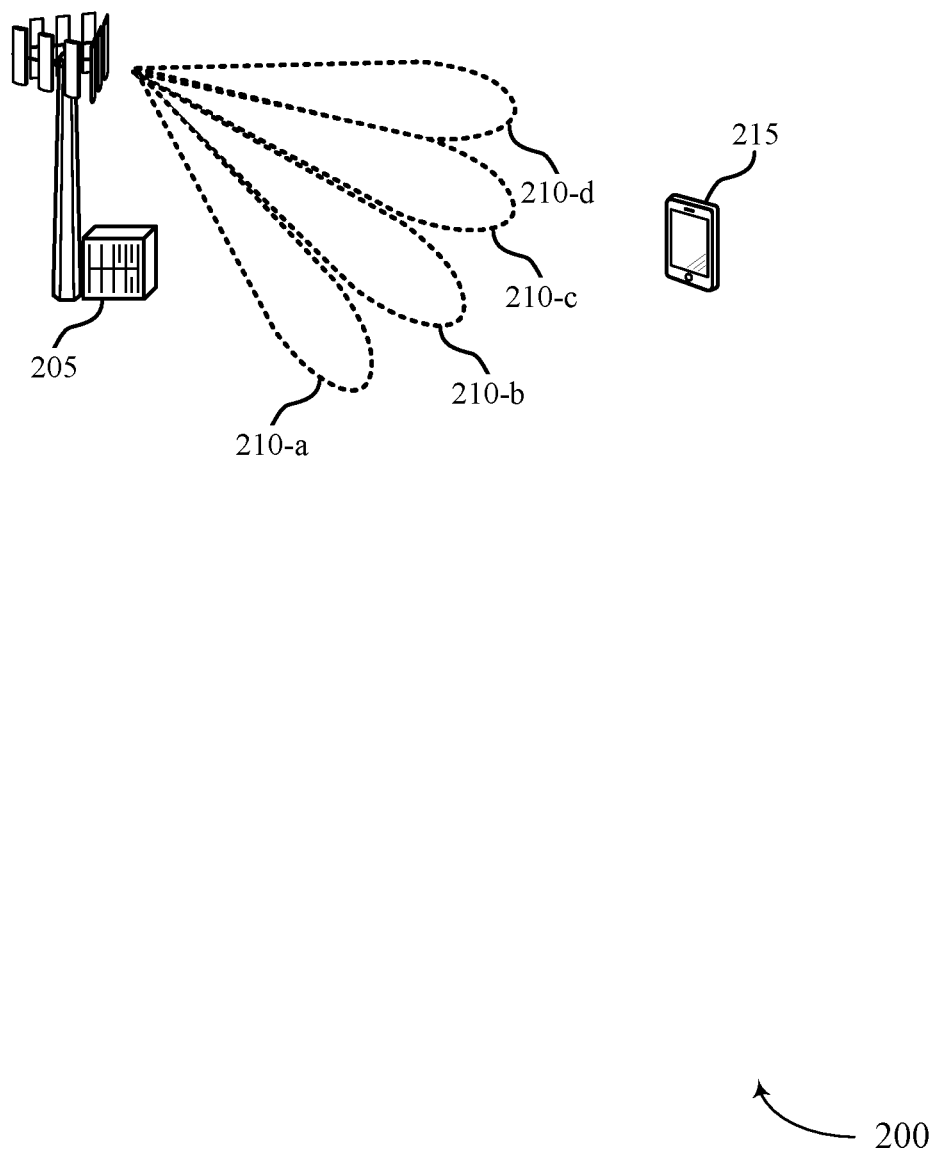
FIG. 2 illustrates an example of a system for wireless communication that supports determining beam candidates for transmitting a BFR signal in accordance with aspects of the present disclosure.

FIG. 2 illustrates an example of a wireless communication system 200 that supports determining beam candidates for transmitting a BFR signal in accordance with various aspects of the present disclosure. In some examples, wireless communication system 200 may implement aspects of wireless communication system 100. Wireless communication system 200 may include a base station 205 and a UE 215, which may be examples of the corresponding devices described herein.

Generally, base station 205 may transmit a plurality of RSs to UEs located with the coverage area of base station 205. The RSs may be transmitted using RS beams 210*a*-210*d*. Each RS beam 210 may have an associated beam ID, beam direction, beam symbols, and the like. Examples of the RSs may include synchronization signals (e.g., primary synchronization signal (PSS), secondary synchronization signal (SSS), and the like), channel performance reference signals (e.g., channel state information reference signal (CSI-RS), demodulation reference signals (DMRSs)), broadcast beams (e.g., physical channel broadcast channel (PBCH) beams), beam refinement beams, or any combinations of such RSs.

In some cases, base station 205 may use interleaved directional RS beams 210 to reduce the time before UE 205 receives an acceptable beam. In some cases, groups of interleaved RS beams 210 may be transmitted at different time periods. In some cases, the interleaved directional RS beams 210 may be transmitted using different antenna ports. In some cases, a sweeping pattern may be used that does not use interleaved RS beams 210.

The UE 215 may identify a beam failure condition. The beam failure condition may be identified based on the UE 215 determining that a metric associated with an active beam (e.g., the beam being used for ongoing communications) has fallen below a threshold. For example, the UE 215 may determine that an estimated BLER of a control channel has fallen below the threshold, and this may trigger the beam failure condition.

The UE 215 may monitor the RS beams 210 transmitted from the base station 205 over a time period, e.g., the UE 215 may store information associated with any RS beams 210 detected within a certain time period. For example, for each detected RS beam 210, the UE 215 may determine and/or store beam strength metrics such as a RSRP, RSRQ, SINR, estimated BLER, and the like. Accordingly, the UE 215 may maintain a list of candidate beams suitable (e.g., satisfying the beam strength threshold) for transmitting a BFR signal, e.g., before any beam failure condition is identified.

The UE 215 may be configured with a beam strength threshold to be used when selecting resources associated with a RS beam 210 to be used for transmitting a BFR signal. For example, base station 205 may transmit a configuration message to UE 215 that indicates the beam strength threshold. Generally, the beam strength threshold may be usable by the UE 215 as a criterion when selecting the resources associated with the RS beam 210 that will be used for transmitting the BFR signal. The BFR signal generally provides a trigger mechanism by which the base station 205 and UE 215 perform a beam recovery procedure to identify a new active beam.

In some aspects, the beam strength threshold may be different from a threshold used to identify the beam failure condition, e.g., such as an estimated BLER threshold. For example, the UE 215 may use the beam strength threshold (e.g., RSRP, RSRQ, SINR, etc.) when selecting the best candidate beam to use for BFR signal transmission that is different from an estimated BLER threshold configured by the network. Broadly, this may support the UE 215 to identify any candidate beams that may be suitable for transmission of the BFR signal, thus improving the chances that UE 215 can recover from the beam failure condition. In some aspects, calculation of the beam strength threshold may be simpler for UE 215 than computation of the threshold used to identify the beam failure condition.

The UE 215 may determine whether any RS beam 210 satisfies the beam strength threshold. Broadly, if the UE 215 detects one or more RS beams 210 with a beam strength satisfying the threshold, the UE 215 may transmit the BFR signal using a beam corresponding to any one of those RS beams 210. For example, the UE 215 may use the beam strength metrics (e.g., RSRP, RSRQ, SINR, BLER, etc.) from the RS beams 210 to identify which RS beams 210 satisfy the threshold. As one non-limiting example, RS beams 210-*a* and 210-*b* may have beam strength metrics that fail to satisfy the threshold and RS beams 210-*c* and 210-*d* may have beam strength metrics that satisfy the threshold. Between RS beams 210-*c* and 210-*d*, RS beam 210-*c* may have the highest beam strength.

In some aspects, UE 215 may therefore detect a set of RS beams 210 and determine that more than one of the RS beams 210 (e.g., RS beams 210-*c* and 210-*d*) of the set satisfy the beam strength threshold. As one response option, UE 215 may select any of the more than one RS beams 210 as the RS beam 210 (e.g., either of RS beams 210-*c* and 210-*d*). As another response option, UE 215 may select the RS beam 210 from the more than one RS beams 210 having the highest beam strength as the RS beam 210 (e.g., RS beam 210-*c*). Accordingly, the UE 215 may transmit the BFR signal using resources associated with the RS beam 210 (e.g., RS beam 210-*c*).

However, in some scenarios UE 215 may not detect any RS beams 210 that satisfy the threshold. For example, UE 215 may be tuned away when RS beams 210-*c* and 210-*d* were transmitted but may be tuned to base station 205 when RS beams 210-*a* and 210-*b* are transmitted. In this instance, UE 215 may select any detected RS beam 210 (e.g., RS beam 210-*a* or 210-*b*) to transmit the BFR signal or may select the detected RS beam 210 (e.g., RS beam 210-*b*) having the highest beam strength to transmit the BFR signal.

In some aspects, this may include UE 215 detecting a set of RS beams 210 (e.g., RS beams 210-a and 210-b) and determining that the RS beams of the set fail to satisfy the beam strength threshold. As one response option, the UE 215 may select any RS beam 210 from the set of detected RS beams 210 as the RS beam 210. As another response option, the UE 215 may select a RS beam 210 from among the set of RS beams 210 that has the highest beam strength as the RS beam 210.

In some aspects, UE 215 may identify a number of beam directions (e.g., RS beam 210) that satisfy a path loss or transmission power condition. The UE 215 may then select a beam direction for transmitting a BFR signal by choosing one of the acceptable beam directions that satisfies additional criteria (e.g., the beam strength threshold). In some examples, the conditions may be in either a hierarchical relationship or a peer relationship, depending on the system design. For example, if each beam direction is associated with a defined time slot, a beam direction may be selected to reduce the time before the BFR signal may be transmitted. The transmission power may be selected based on a target receive power and a path loss for the selected beam direction. In some cases, if the sum of the path loss for a beam direction and the target receive power exceeds a maximum transmission power by more than a predetermined amount, the BFR signal will not be transmitted using that beam direction. In some cases, if a response to the BFR is not received, a different beam direction may be selected, the transmission power may be increased, or both.

In some aspects, UE 215 may receive the directional RS beams 210 and identify a number of candidate beam directions for transmitting a BFR signal based on a transmission power condition. In general, a BFR signal transmission power, $P_{BFR}$, may be determined according to the equation:

$$P_{BFR} = \min\{P_{CMAX(i)}, \text{Preamble\_Received\_Target\_Power} + PL\} \text{ [dBm]},$$

where $P_{CMAX(i)}$ is the configured UE transmit power defined for a given subframe with index i, PL is the downlink path loss estimate (e.g., calculated by UE 215 based on the received power of a beamforming reference signal (BRS) associated with a given beam), and, Preamble_Received_Target_Power is a parameter that base station 205 may set to indicate the power at which it would like to receive the BFR signal. Power transmission parameters may be set by base station 205 using a system information message, e.g., in a system information block (SIB) transmission.

In some cases, a beam may be identified as a suitable candidate if the desired transmit power is less than a maximum transmit power:

$$\text{Preamble\_Receive\_Target\_Power} + PL \leq P_{CMAX(i)}$$

Accordingly, a beam direction may be considered inadequate or restricted if the path loss corresponding to that direction satisfies:

$$\text{Preamble\_Receive\_Target\_Power} + PL > P_{CMAX(i)}$$

In other cases, different parameters may be used to select the candidate beam directions. However, the transmission power may still be limited by the maximum transmission power $P_{CMAX(i)}$. In some cases, a UE 215 may identify suitable beam directions based on a power gap parameter, a, according to the equation:

$$\text{Preamble\_Receive\_Target\_Power} + PL \leq P_{CMAX(i)} + \alpha$$

Accordingly, a beam direction may be considered inadequate or restricted if the path loss corresponding to that direction satisfies:

$$\text{Preamble}_{Receive_{Target_{Power}}} + PL > P_{C<MAX(i)} + \alpha$$

That is, UE 215 may identify a beam direction as a candidate if the sum of the target receive power and the path loss for a beam direction exceed the maximum transmit power by less than the power gap parameter. Thus, UE 215 may identify a number of candidate beam directions. UE 215 may then select a beam direction, and transmit BFR signal using resources associated with the selected beam direction. In some cases, the beam direction may be selected such that UE 215 may transmit the BFR signal during a next available transmission opportunity. In some cases, UE 215 may select a beam based on a channel metric for the candidate beam directions (e.g., the direction with the lowest path loss or high signal-to-noise ratio). In some cases, the beam direction with the highest received beam strength may be selected. In other cases, the beam direction may be selected randomly from among the candidate beams. In some examples, the conditions may be in either a hierarchical relationship, or a peer relationship, depending on the system design.

In some cases, $P_{BFR}$ may indicate an initial transmit power for the BFR signal. That is, UE 215 may initially transmit a BFR signal using $P_{BFR}$, but, if it does not get a BFR response message, it may ramp up the transmit power in the subsequent BFR signal transmissions. That is, in some cases, $P_{BFR}$ may be less than the maximum transmit power $P_{CMAX(i)}$.

Thus, for example, UE 215 may initially transmit at $P_{BFR}$ using a given beam direction, I. In the next subframe, UE 215 transmits at $P_{BFR}$ where the parameter β represents the amount of the power increase. In some cases, UE 215 may continue to use beam I even if the current preferred beam is different (e.g., beam J). In another example, UE 215 initially transmits at $P_{BFR}$ using beam I. Then, in the next subframe, UE 215 may transmit at the same power level using the current preferred beam, beam J. In yet another example, UE 215 initially transmits at $P_{BFR}$ using beam I, then in the next subframe, transmits at $P_{BFR}+\beta$ using the new preferred beam J. In some cases, base station 205 may indicate the procedures for selecting candidate beams, transmit power, and power ramp up in a configuration message.

In some examples, UE 215 may ramp up transmit power in some BFR signal retransmissions and select a preferred beam in other BFR signal retransmissions. For example, if UE 215 initially transmits BFR signal at $P_{BFR}$ power while selecting beam I for its transmission time and this transmission fails, then in the next transmission opportunity, UE 215 may transmit using power level $P_{BFR}+\beta$ and using the transmission time corresponding to the same beam, e.g., beam I. If this BFR signal transmission fails, then in the next transmission opportunity, UE 215 may transmit using power $P_{BFR}+\beta$ while selecting the transmission time corresponding to the new preferred beam, e.g., beam J. If the second BFR signal transmission fails, then in the next transmission opportunity, UE 215 may transmit using power level $P_{BFR}+2\beta$ while selecting the transmission time corresponding to the previously preferred beam J. If the third BFR signal transmission fails, then in the next transmission opportunity, UE 215 may transmit at $P_{BFR}+2\beta$ with yet another preferred beam, e.g., beam K.

In cases when interleaved sweeping is used, base station 205 may configure a first set of beam directions for a RS to be broadcasted to UE 215. Base station 205 may perform this transmission by beamforming using interleaved sweeping. The base station 205 may transmit a first plurality of RS beams 210 over a first symbol period of a subframe and a second plurality of RS beams 210 over a second symbol period of a subframe. For the first plurality of RS beams 210, base station 205 may transmit the RS beams 210 in a first set of beams (e.g., beams 210-a and 210-c), where the first set of beams correspond to a part of a first set of directions. For the second symbol period, base station 205 may transmit the second plurality of RS beams 210 in a second set of beams (e.g., beams 210-b and 210-d), where the second set of beams may correspond to a part of a second set of beam directions. The second set of beam directions may interleave with the first set of directions. For example, beam 210-b may be spatially in between beam 210-a and beam 210-c, and beam 210-c may spatially be between beam 210-b and beam 210-d.

Thus, in some cases, the first set of beams may include two sets of interleaved beams. In this way, the first and second sets of beams may be spread further apart to cover a larger area. In FIG. 2, the first set of beams may include two beams, RS beams 210-a and 210-c, and the second set of beams may include two beams, RS beams 210-b and 210-d. In other examples, more beams may be included in the first and second set of beams. In some examples, three or more sets of beams may be used. For example, base station 205 may support eight antenna ports for beamforming, and the first set of beams may include eight RS beams 210 that are spatially interleaved with a second set of beams that may also include eight RS beams 210. In some examples, each of beams 210-a and 210-c may alternate with each of beams 210-b and 210-d, such that a first beam of the first set of RS beams 210-a and 210-c may be oriented at a first angle, a first beam of the second set of beams 210-b and 210-d may be oriented at a second angle adjacent to the first beam of the first set of beams 210-a and 210-c, followed at a next radial angle by a second beam of the first set of beams 210-a and 210-c that is oriented at a third angle adjacent to the first beam of the second set of beams 210-b and 210-d, followed at a next radial angle by a second beam of the second set of beams 210-b and 210-d that is oriented at a fourth angle adjacent to the second beam of the first set of beams 210-a and 210-c, and so on. As such, the first set of beams may have an angular spread about a vertical axis of the base station 205 that is approximately the same as the angular spread of the second set of beams about the vertical axis of the base station 205. For example, each of the first set of beams and the second set of beams may have an angular spread in the range of approximately 30° to 90° and in some cases, the angular spread may be approximately 45°.

In other examples, the first set of beams and the second set of beams may be interleaved according to other arrangements or patterns, e.g., that do not strictly alternate. For example, two of beams 210-a and 210-c may be followed by two of beams 210-b and 210-d, followed by two of beams 210-a and 210-c, followed by two of beams 210-b and 210-d, and so on.

Other examples may include interleaving beams of the first set of beams with beams of the second set of beams in both an angular direction about the vertical axis of the base station 205 as well as in the vertical direction where vertical beamforming may be used. For example, a RS beam 210-d may by oriented above (e.g., to be directed vertically higher than) RS beam 210-b at a first angular direction about the vertical base station 205 axis, while a RS beam 210-c may by oriented above beam 210-a in a second angular direction about the vertical base station 205 axis that is adjacent to the first angular direction. More than two sets of beams (e.g., three or more sets of beams) may be spatial interleaved according to other patterns, and thereby decrease latency.

UE 215 may decode RS beams 210 received from the base station 205. UE 215 may receive the first plurality of RS beams 210 in the first set of directions (e.g., beams 210-a and 210-c). However, the receiving power of the first plurality of RS beams 210 may be weak due to a low gain corresponding to the first set of directions. UE 215 may still be able to decode the RS beams 210-a and 210-c and subsequently determine a set of frequencies to transmit to base station 205 (e.g., for a BFR signal). UE 215 may additionally receive a second plurality of RSs in the second set of directions (e.g., beams 210-b and 210-d). The RSs received in the second set of directions may have a stronger receiving power in relation to the RSs received in the first set of directions. This may be due to a higher gain corresponding to the second set of directions. UE 215 may then determine to allocate resources for the second symbol period for the BFR signal transmission. Subsequently, UE 215 may transmit the BFR signal. The BFR signal may be transmitted in the direction of the received RSs for the second symbol period.

In other examples, base station 205 may monitor for beams in a first set of directions from UE 215, and may monitor for beams in a second set of direction from UE 215, where the second set of beam directions may be spatially interleaved with the first set of beam directions. For example, the monitoring may include the base station 205 altering antenna parameters (e.g., phase and amplitude) for a number of antenna elements in an antenna array to listen for signals at a particular time and frequency from UEs that may also have implemented beamforming to transmit to the base station 205. In some examples, UE 215 may transmit a BFR signal that may be part of a beam recovery procedure. Similar to the transmission of beams in a first set of directions and beams in a second set of directions, UE 215 may monitor in such directions where the beams are spatially interleaved in an angular direction about the vertical axis of the base station 205 (e.g., by alternating or according to another pattern). In other examples, the first and second set of beams may also be vertically interleaved (e.g., alternating, or according to another pattern).

Thus, in some examples UE 215 may have received one or more RS beams 210 from base station 205 as further described herein, and transmit a BFR signal or other signaling to base station 205 during a subframe. As described herein, base station 205 may transmit or monitor using a first set of beams in a first symbol period and transmit or monitor using a second set of beams in a second symbol period. In some cases, the symbol periods may be adjacent symbol periods in a subframe (e.g., a synchronization subframe for transmission, or a random access subframe for monitoring). For example, a first symbol of a subframe to transmit on a first set of beams may be immediately adjacent to a second symbol of the subframe to transmit using a second set of beams, as described herein. In other examples, the first set of beams may be used to transmit RS beams 210 in both the first and second symbols of the subframe, while the second set of RS beams 210 may be used to transmit RSs in both a third and a fourth symbol of the subframe, for example to increase the likelihood of successful decoding by a UE 215 if conditions are poor.

Figure 3:
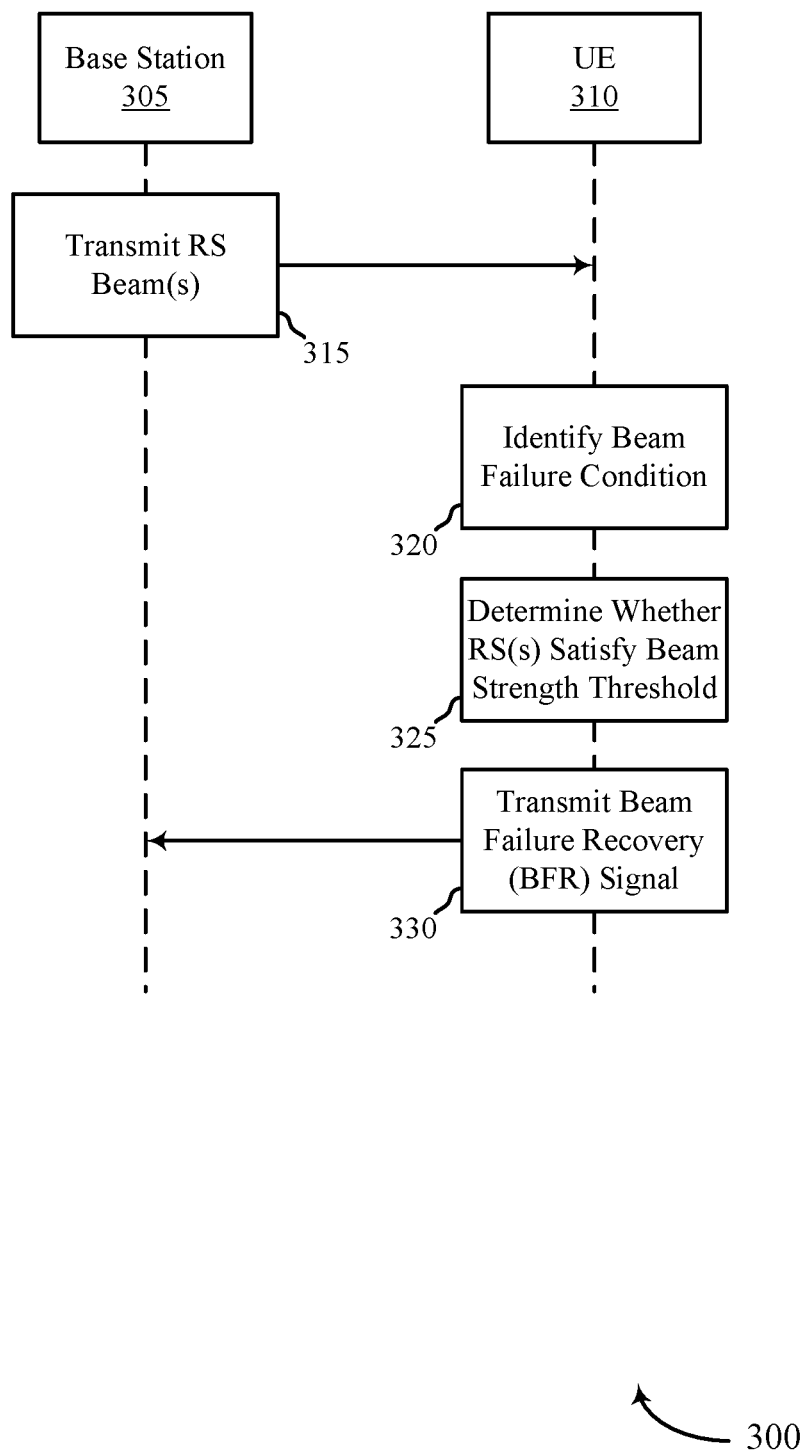
FIG. 3 illustrates an example of a process that supports determining beam candidates for transmitting a BFR signal in accordance with aspects of the present disclosure.

FIG. 3 illustrates an example of a process 300 that supports determining beam candidates for transmitting a BFR signal in accordance with various aspects of the present disclosure. In some examples, process 300 may implement aspects of wireless communication systems 100/200. Process 300 may include a base station 305 and a UE 310, which may be examples of the corresponding devices described herein.

At 315, base station 305 may transmit (and UE 310 may receive) RS beams. The RS beams may include SS beams, PBCH blocks, CSI-RSs, and the like.

At 320, UE 310 may identify a beam failure condition. The beam failure condition may be triggered or otherwise identified based on a defined criteria is met. As one non-limiting example, this may include an estimated BLER of a control channel falling below a threshold.

At 325, UE 310 may determine whether any RS beams satisfy a beam strength threshold. In some aspects, this may include detecting a set of RS beams and determining that more than one of the RS beams of the set satisfy the beam strength threshold. The UE 310 may select any of the more than one RS beams as the reference signal beam. The UE 310 may select the RS beam from the more than one RS beams having the highest beam strength as the RS beam.

In some aspects, this may include UE 310 detecting a set of RS beams and determining that the RS beams of the set fail to satisfy the beam strength threshold. The UE 310 may select any RS beam from the set of detected RS beams as the reference signal beam. The UE 310 may select a RS beam from among the set of RS beams that has the highest beam strength as the RS beam.

In some aspects, the UE 310 may receive a configuration message indicating the beam strength threshold (e.g., from base station 305).

At 330, UE 310 may transmit (and base station 305 may receive) a BFR signal using resources associated with the RS beam, e.g., the RS beam that satisfies the threshold.

Figure 4:
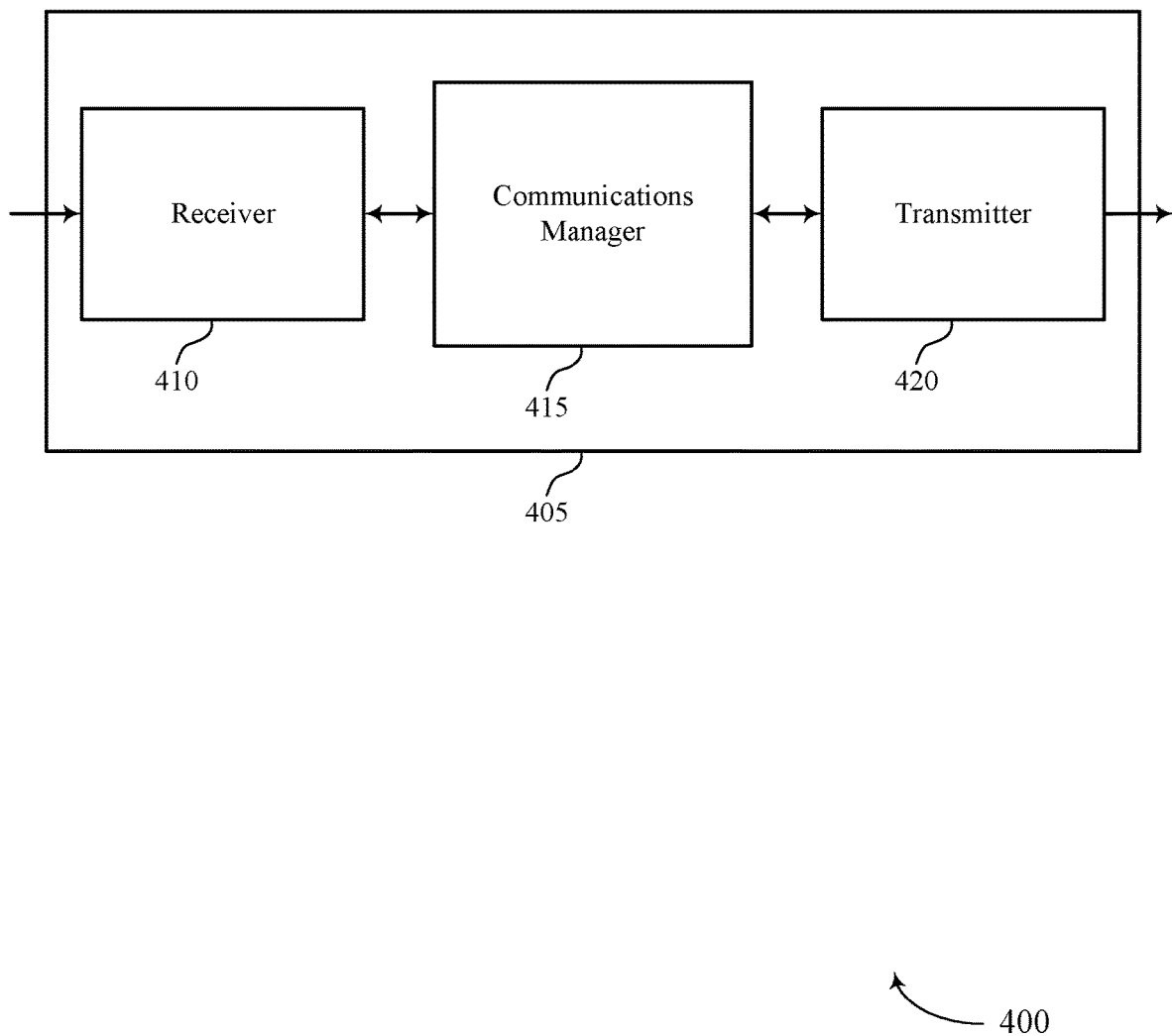
FIGS. 4 through 6 show block diagrams of a device that supports determining beam candidates for transmitting a BFR signal in accordance with aspects of the present disclosure.

FIG. 4 shows a block diagram 400 of a wireless device 405 that supports determining beam candidates for transmitting a BFR signal in accordance with aspects of the present disclosure. Wireless device 405 may be an example of aspects of a UE 115 as described herein. Wireless device 405 may include receiver 410, communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to determining beam candidates for transmitting BFR signal, etc.). Information may be passed on to other components of the device. The receiver 410 may be an example of aspects of the transceiver 735 described with reference to FIG. 7. The receiver 410 may utilize a single antenna or a set of antennas.

Communications manager 415 may be an example of aspects of the communications manager 715 described with reference to FIG. 7.

Communications manager 415 and/or at least some of its various sub-components may be implemented in hardware, software executed by a processor, firmware, or any combination thereof. If implemented in software executed by a processor, the functions of the communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 415 and/or at least some of its various sub-components may be physically located at various positions, including being distributed such that portions of functions are implemented at different physical locations by one or more physical devices. In some examples, communications manager 415 and/or at least some of its various sub-components may be a separate and distinct component in accordance with various aspects of the present disclosure. In other examples, communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 415 may identify a beam failure condition, determine whether a reference signal beam satisfies a beam strength threshold, and transmit, based on a result of the determining, a BFR signal using resources associated with the reference signal beam.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
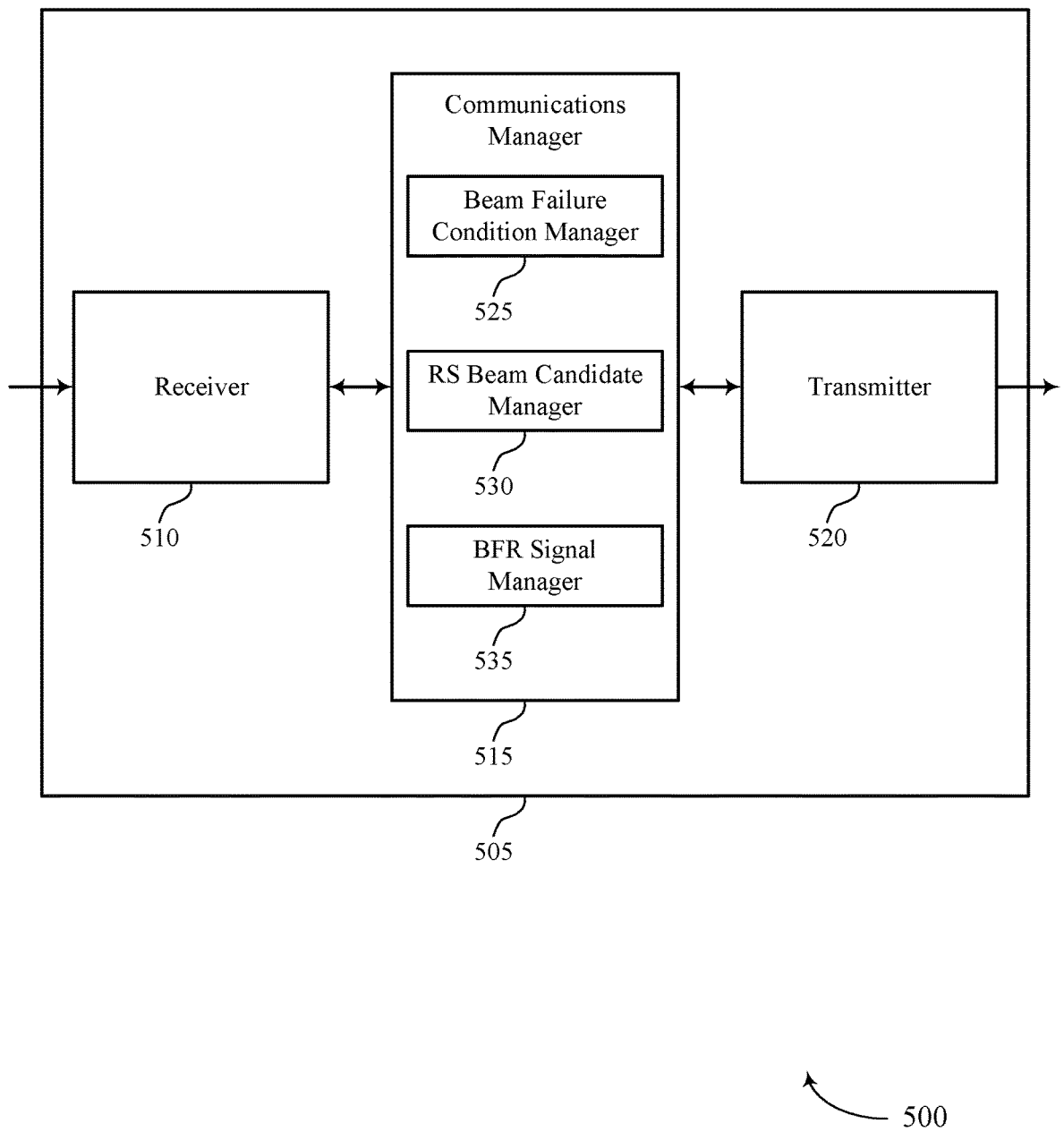

FIG. 5 shows a block diagram 500 of a wireless device 505 that supports determining beam candidates for transmitting a BFR signal in accordance with aspects of the present disclosure. Wireless device 505 may be an example of aspects of a wireless device 405 or a UE 115 as described with reference to FIG. 4. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to determining beam candidates for transmitting BFR signal, etc.). Information may be passed on to other components of the device. The receiver 510 may be an example of aspects of the transceiver 735 described with reference to FIG. 7. The receiver 510 may utilize a single antenna or a set of antennas.

Communications manager 515 may be an example of aspects of the communications manager 715 described with reference to FIG. 7. Communications manager 515 may also include beam failure condition manager 525, RS beam candidate manager 530, and BFR signal manager 535. Beam failure condition manager 525 may identify a beam failure condition.

RS beam candidate manager 530 may determine whether a reference signal beam satisfies a beam strength threshold. In some cases, determining whether a reference signal beam satisfies the beam strength threshold includes: determining that the reference signal beam is received with a beam strength metric satisfying the threshold. In some cases, the beam strength metric includes one or more of a RSRP metric, or a RSRQ metric, or a SINR, or an estimated BLER, or a combination thereof.

BFR signal manager 535 may transmit, based on a result of the determining, a BFR signal using resources associated with the reference signal beam.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
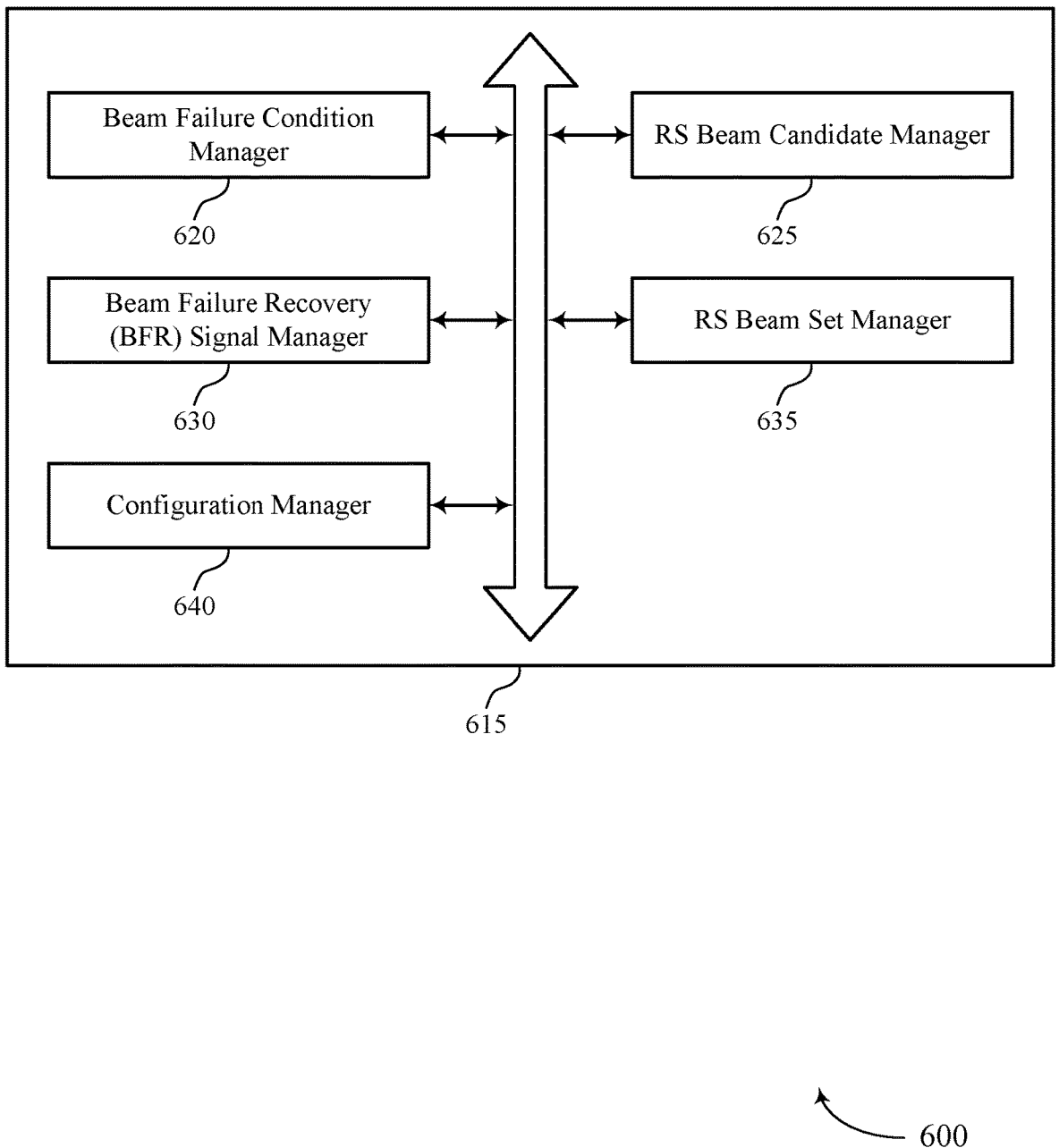

FIG. 6 shows a block diagram 600 of a communications manager 615 that supports determining beam candidates for transmitting a BFR signal in accordance with aspects of the present disclosure. The communications manager 615 may be an example of aspects of a communications manager 415, a communications manager 515, or a communications manager 715 described with reference to FIGS. 4, 5, and 7. The communications manager 615 may include beam failure condition manager 620, RS beam candidate manager 625, BFR signal manager 630, RS beam set manager 635, and configuration manager 640. Each of these modules may communicate, directly or indirectly, with one another (e.g., via one or more buses).

Beam failure condition manager 620 may identify a beam failure condition.

RS beam candidate manager 625 may determine whether a reference signal beam satisfies a beam strength threshold. In some cases, determining whether a reference signal beam satisfies the beam strength threshold includes: determining that the reference signal beam is received with a beam strength metric satisfying the threshold. In some cases, the beam strength metric includes one or more of a RSRP metric, or a RSRQ metric, or a SINR, or an estimated BLER, or a combination thereof.

BFR signal manager 630 may transmit, based on a result of the determining, a BFR signal using resources associated with the reference signal beam.

RS beam set manager 635 may detect a set of reference signal beams and determining that the reference signal beams of the set fail to satisfy the beam strength threshold, detect a set of reference signal beams and determining that the reference signal beams of the set fail to satisfy the beam strength threshold, select any reference signal beam from the set of detected reference signal beams as the reference signal beam, select a reference signal beam from among the set of reference signal beams that has the highest beam strength as the reference signal beam, detect a set of reference signal beams and determining that more than one of the reference signal beams of the set satisfy the beam strength threshold, select any of the more than one reference signal beams as the reference signal beam, and select the reference signal beam from the more than one reference signal beams having the highest beam strength as the reference signal beam.

Configuration manager 640 may receive a configuration message that indicates the beam strength threshold.

Figure 7:
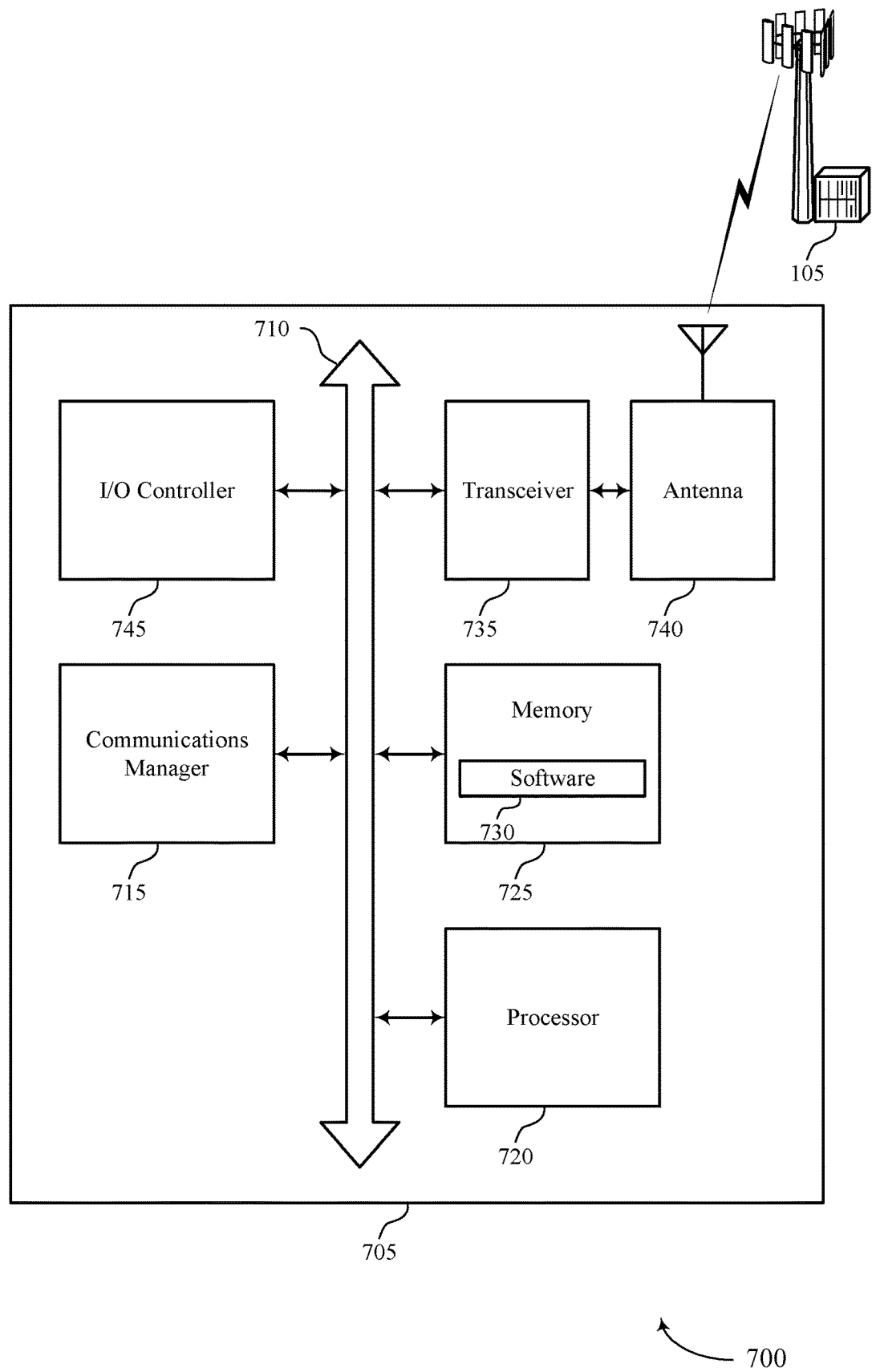
FIG. 7 illustrates a block diagram of a system including a UE that supports determining beam candidates for transmitting a BFR signal in accordance with aspects of the present disclosure.

FIG. 7 shows a diagram of a system 700 including a device 705 that supports determining beam candidates for transmitting a BFR signal in accordance with aspects of the present disclosure. Device 705 may be an example of or include the components of wireless device 405, wireless device 505, or a UE 115 as described above, e.g., with reference to FIGS. 4 and 5. Device 705 may include components for bi-directional voice and data communications including components for transmitting and receiving communications, including communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting determining beam candidates for transmitting BFR signal).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support determining beam candidates for transmitting BFR signal. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described herein. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
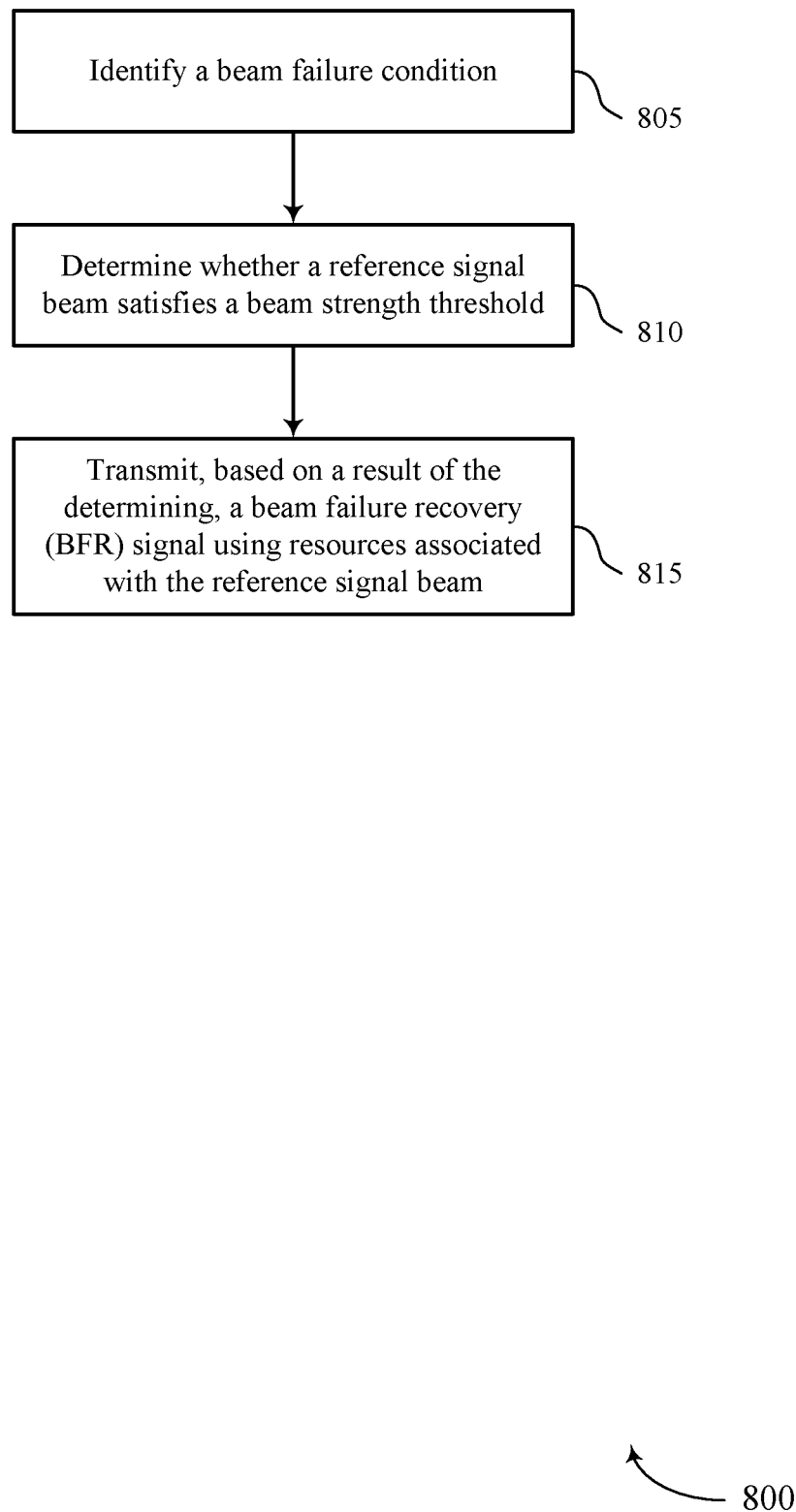
FIGS. 8 through 10 illustrate methods for determining beam candidates for transmitting a BFR signal in accordance with aspects of the present disclosure.

FIG. 8 shows a flowchart illustrating a method 800 for determining beam candidates for transmitting a BFR signal in accordance with aspects of the present disclosure. The operations of method 800 may be implemented by a UE 115 or its components as described herein. For example, the operations of method 800 may be performed by a communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 805 the UE 115 may identify a beam failure condition. The operations of 805 may be performed according to the methods described herein. In certain examples, aspects of the operations of 805 may be performed by a beam failure condition manager as described with reference to FIGS. 4 through 7.

At 810 the UE 115 may determine whether a reference signal beam satisfies a beam strength threshold. The operations of 810 may be performed according to the methods described herein. In certain examples, aspects of the operations of 810 may be performed by a RS beam candidate manager as described with reference to FIGS. 4 through 7.

At 815 the UE 115 may transmit, based at least in part on a result of the determining, a BFR signal using resources associated with the reference signal beam. In some examples, hardware, such an antenna, may be configured to transmit, based at least in part on a result of the determining, a BFR signal using resources associated with the reference signal beam. The operations of 815 may be performed according to the methods described herein. In certain examples, aspects of the operations of 815 may be performed by a BFR signal manager as described with reference to FIGS. 4 through 7.

Figure 9:
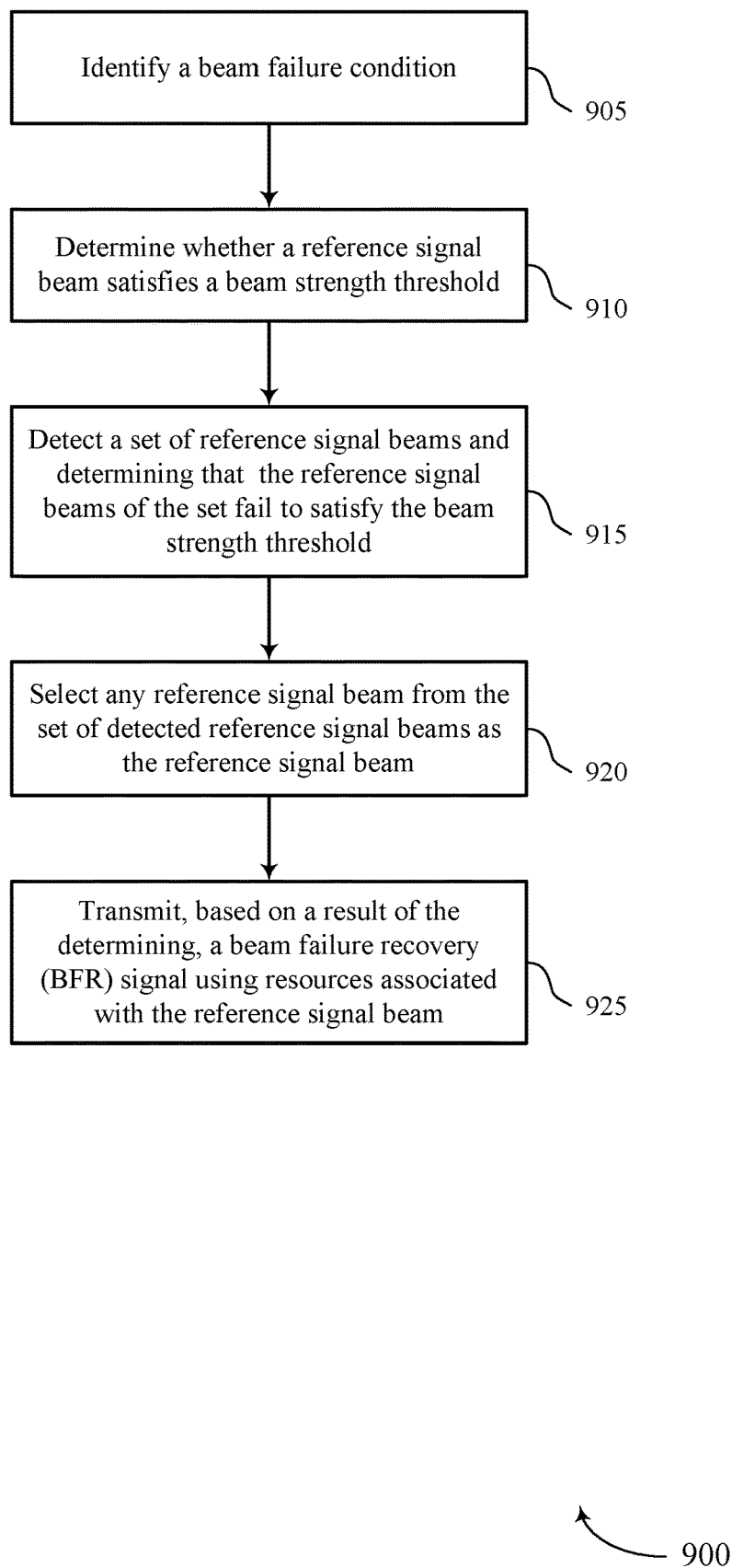

FIG. 9 shows a flowchart illustrating a method 900 for determining beam candidates for transmitting a BFR signal in accordance with aspects of the present disclosure. The operations of method 900 may be implemented by a UE 115 or its components as described herein. For example, the operations of method 900 may be performed by a communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 905 the UE 115 may identify a beam failure condition. The operations of 905 may be performed according to the methods described herein. In certain examples, aspects of the operations of 905 may be performed by a beam failure condition manager as described with reference to FIGS. 4 through 7.

At 910 the UE 115 may determine whether a reference signal beam satisfies a beam strength threshold. The operations of 910 may be performed according to the methods described herein. In certain examples, aspects of the operations of 910 may be performed by a RS beam candidate manager as described with reference to FIGS. 4 through 7.

At 915 the UE 115 may detect a set of reference signal beams and determining that the reference signal beams of the set fail to satisfy the beam strength threshold. The operations of 915 may be performed according to the methods described herein. In certain examples, aspects of the operations of 915 may be performed by a RS beam set manager as described with reference to FIGS. 4 through 7.

At 920 the UE 115 may select any reference signal beam from the set of detected reference signal beams as the reference signal beam. The operations of 920 may be performed according to the methods described herein. In certain examples, aspects of the operations of 920 may be performed by a RS beam set manager as described with reference to FIGS. 4 through 7.

At 925 the UE 115 may transmit, based at least in part on a result of the determining, a BFR signal using resources associated with the reference signal beam. In some examples, hardware, such an antenna, may be configured to transmit, based at least in part on a result of the determining, a BFR signal using resources associated with the reference signal beam. The operations of 925 may be performed according to the methods described herein. In certain examples, aspects of the operations of 925 may be performed by a BFR signal manager as described with reference to FIGS. 4 through 7.

Figure 10:
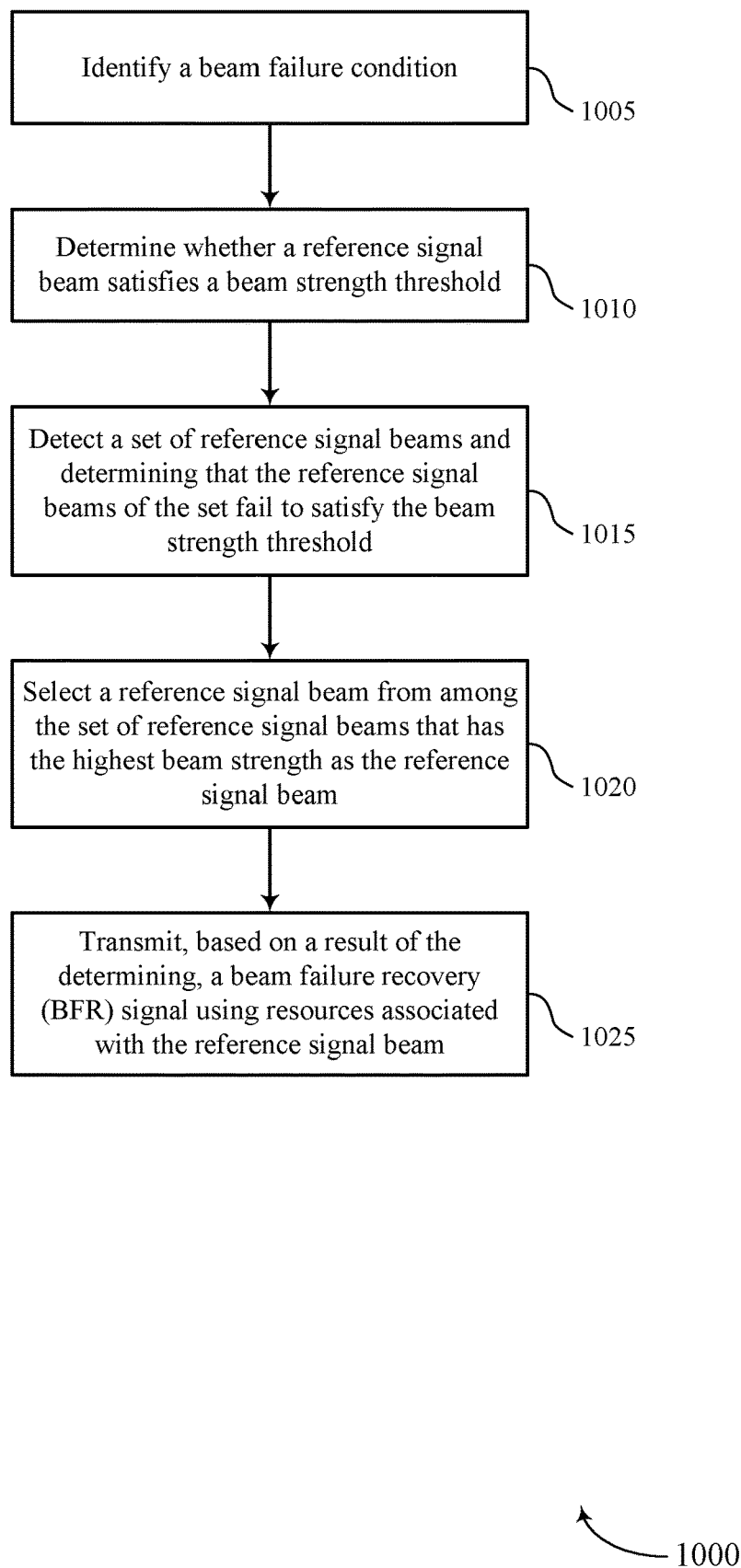

FIG. 10 shows a flowchart illustrating a method 1000 for determining beam candidates for transmitting a BFR signal in accordance with aspects of the present disclosure. The operations of method 1000 may be implemented by a UE 115 or its components as described herein. For example, the operations of method 1000 may be performed by a communications manager as described with reference to FIGS. 4 through 7. In some examples, a UE 115 may execute a set of codes to control the functional elements of the device to perform the functions described herein. Additionally or alternatively, the UE 115 may perform aspects of the functions described herein using special-purpose hardware.

At 1005 the UE 115 may identify a beam failure condition. The operations of 1005 may be performed according to the methods described herein. In certain examples, aspects of the operations of 1005 may be performed by a beam failure condition manager as described with reference to FIGS. 4 through 7.

At 1010 the UE 115 may determine whether a reference signal beam satisfies a beam strength threshold. The operations of 1010 may be performed according to the methods described herein. In certain examples, aspects of the operations of 1010 may be performed by a RS beam candidate manager as described with reference to FIGS. 4 through 7.

At 1015 the UE 115 may detect a set of reference signal beams and determining that the reference signal beams of the set fail to satisfy the beam strength threshold. The operations of 1015 may be performed according to the methods described herein. In certain examples, aspects of the operations of 1015 may be performed by a RS beam set manager as described with reference to FIGS. 4 through 7.

At 1020 the UE 115 may select a reference signal beam from among the set of reference signal beams that has a highest beam strength as the reference signal beam. The operations of 1020 may be performed according to the methods described herein. In certain examples, aspects of the operations of 1020 may be performed by a RS beam set manager as described with reference to FIGS. 4 through 7.

At 1025 the UE 115 may transmit, based at least in part on a result of the determining, a BFR signal using resources associated with the reference signal beam. In some examples, hardware, such an antenna, may be configured to transmit, based at least in part on a result of the determining, a BFR signal using resources associated with the reference signal beam. The operations of 1025 may be performed according to the methods described herein. In certain examples, aspects of the operations of 1025 may be performed by a BFR signal manager as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying that a beam failure condition has occurred;
   detecting a set of reference signal beams and determining that more than one of the reference signal beams of the set are received with a respective beam strength metric that is greater than a beam strength threshold;
   selecting a reference signal beam from the more than one reference signal beams; and
   transmitting a beam failure recovery (BFR) signal using resources associated with the selected reference signal beam.

2. The method of claim 1, further comprising:
   receiving a configuration message that indicates the beam strength threshold for determining the reference signal beam associated with the resources for transmitting the BFR signal.

3. The method of claim 1, wherein the beam strength metric comprises one or more of a reference signal received power (RSRP) metric, or a reference signal received quality (RSRQ) metric, or a signal-to-interference-plus-noise ratio (SINK), or an estimated block error ratio (BLER), or a combination thereof.

4. The method of claim 1, wherein selecting the reference signal beam comprises:
   selecting the reference signal beam from the more than one reference signal beams based at least in part on the reference signal beam having a highest beam strength among the more than one reference signal beams.

5. An apparatus for wireless communication, comprising:
   a processor;
   memory in electronic communication with the processor; and
   instructions stored in the memory and executable by the processor to cause the apparatus to:
     identify that a beam failure condition has occurred; and
     detect a set of reference signal beams and determine that more than one of the reference signal beams of the set are received with a respective beam strength metric that is greater than a beam strength threshold; and
     select a reference signal beam from the more than one reference signal beams; and
   an antenna configured to transmit a beam failure recovery (BFR) signal using resources associated with the selected reference signal beam.

6. The apparatus of claim 5, wherein the instructions are further executable by the processor to cause the apparatus to:
   receive a configuration message that indicates the beam strength threshold for determining the reference signal beam associated with the resources for transmitting the BFR signal.

7. The apparatus of claim 5, wherein the beam strength metric comprises one or more of a reference signal received power (RSRP) metric, or a reference signal received quality (RSRQ) metric, or a signal-to-interference-plus-noise ratio (SINK), or an estimated block error ratio (BLER), or a combination thereof.

8. The apparatus of claim 5, wherein the instructions to select the reference signal beam are executable by the processor to cause the apparatus to:
   select the reference signal beam from the more than one reference signal beams based at least in part on the reference signal beam having a highest beam strength among the more than one reference signal beams.

9. An apparatus for wireless communication, comprising:
   means for identifying that a beam failure condition has occurred;
   means for detecting a set of reference signal beams and determining that more than one of the reference signal beams of the set are received with a respective beam strength metric that is greater than a beam strength threshold;
   means for selecting a reference signal beam from the more than one reference signal beams; and
   means for transmitting a beam failure recovery (BFR) signal using resources associated with the reference signal beam.

10. The apparatus of claim 9, further comprising:
    means for receiving a configuration message that indicates the beam strength threshold for determining the reference signal beam associated with the resources for transmitting the BFR signal.

11. The apparatus of claim 9, wherein the beam strength metric comprises one or more of a reference signal received power (RSRP) metric, or a reference signal received quality (RSRQ) metric, or a signal-to-interference-plus-noise ratio (SINK), or an estimated block error ratio (BLER), or a combination thereof.

12. The apparatus of claim 9, wherein selecting the reference signal beam comprises:

means for selecting the reference signal beam from the more than one reference signal beams having a highest beam strength as the reference signal beam.

13. A non-transitory computer-readable medium storing code for wireless communication, the code comprising instructions executable by a processor to:

identify that a beam failure condition has occurred;

detect a set of reference signal beams and determine that more than one of the reference signal beams of the set are received with a respective beam strength metric that is greater than a beam strength threshold;

select a reference signal beam from the more than one reference signal beams; and transmit a beam failure recover (BFR) signal using resources associated with the reference signal beam.

14. The non-transitory computer-readable medium of claim 13, wherein the instructions are further executable by the processor to:

receive a configuration message that indicates the beam strength threshold for determining the reference signal beam associated with the resources for transmitting the BFR signal.

15. The non-transitory computer-readable medium of claim 13, wherein the beam strength metric comprises one or more of a reference signal received power (RSRP) metric, or a reference signal received quality (RSRQ) metric, or a signal-to-interference-plus-noise ratio (SINK), or an estimated block error ratio (BLER), or a combination thereof.

16. The non-transitory computer-readable medium of claim 13, wherein the instructions to select the reference signal beam are executable by the processor to:

select the reference signal beam from the more than one reference signal beams based at least in part on the reference signal beam having a highest beam strength among the more than one reference signal beams.

* * * * *